I. M. SARTAIN.
VEHICLE WHEEL TIRE.
APPLICATION FILED DEC. 1, 1913.
1,102,690.
Patented July 7, 1914.
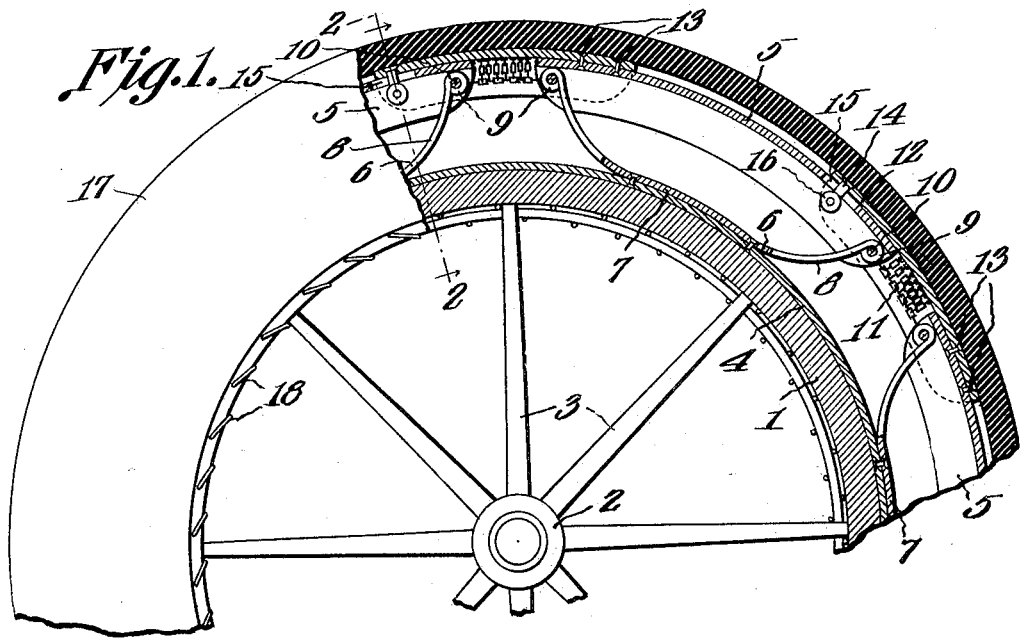
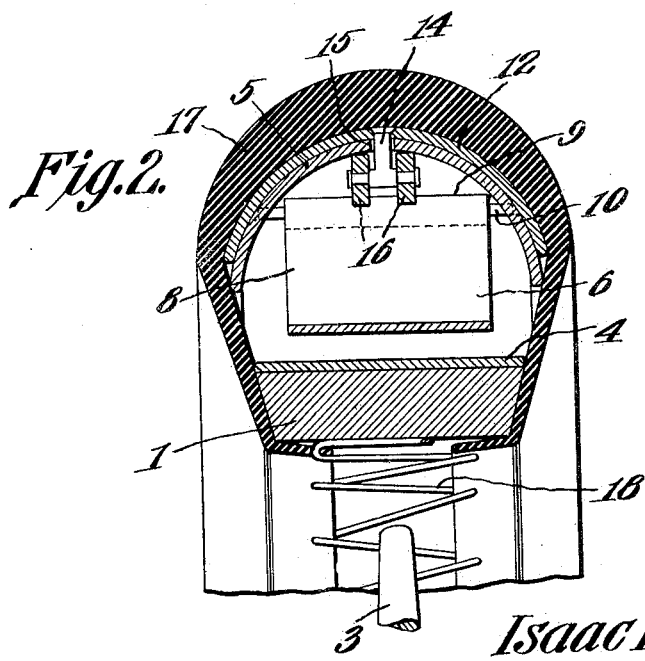
Witnesses
Isaac M. Sartain,
Inventor
by C. A. Snow & Co.
Attorneys

UNITED STATES PATENT OFFICE.

ISAAC MORGAN SARTAIN, OF TRACY CITY, TENNESSEE.

VEHICLE WHEEL-TIRE.

1,102,690.   Specification of Letters Patent.   Patented July 7, 1914.

Application filed December 1, 1913. Serial No. 804,075.

*To all whom it may concern:*

Be it known that I, ISAAC M. SARTAIN, a citizen of the United States, residing at Tracy City, in the county of Grundy and State of Tennessee, have invented a new and useful Vehicle Wheel-Tire, of which the following is a specification.

The present invention appertains generally to vehicle wheel tires, and aims to provide a novel and improved spring tire, for supplanting the ordinary pneumatic tire.

It is the object of the present invention to provide a spring tire of novel and improved construction, which can be employed upon various vehicle wheels, and which shall eliminate the disadvantages of the ordinary pneumatic tire, and at the same time retaining those desirous features of the pneumatic tire, such as resiliency, buoyancy, etc.

Another object of the present invention is to provide a spring tire embodying a unique assemblage of parts whereby the structure will be comparatively simple and inexpensive, as well as practical and efficient in its use.

With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a fragmental side elevation of a vehicle wheel embodying the improved tire structure, a portion of the tire structure being shown in section. Fig. 2 is an enlarged cross section of the tire structure, taken on the line 2—2 of Fig. 1.

In the drawing, there has been illustrated an arbitrary vehicle wheel embodying the rim or felly 1, and the hub 2, which are connected by the usual spokes 3, a band 4 being preferably mounted upon the felly or rim 1. It is to be understood, however, that the wheel structure may be of any suitable character.

In carrying out the present invention, there is provided an annular series of arcuate tire sections 5, which are preferably stamped from sheet metal; and which are concaved transversely, as well as longitudinally. Associated with each tire section 5, is a semi-elliptical spring 6, the central or body portion 7 of which is curved to confrom to the band 4, to be secured thereto by rivets or other securing members. The end portions 8 of each spring 6 are curved away from the band 4, and the terminals of the leaves 8 are formed into butts 9 engaging the cross pins or rods 10 carried by the terminal portions of the complementing tire section 5. The terminals of the cross pins 10 are preferably riveted through the side portions of the tire sections 5 adjoining the ends of the said sections, so that the butts 9 may engage loosely over the central portions of the pins 10, whereby the tire sections will be yieldably supported from and in a spaced relation to the felly or rim 1, with the ends of the adjoining tire sections spaced apart.

The adjoining ends of the tire sections 5 are connected by any suitable chains or flexible elements 11.

Disposed snugly over the adjoining ends of each pair of companion tire sections 5, is a similar arcuate tire section 12, which has one end secured upon the end portion of one tire section 5, by means of the rivets or other securing members 13, and which has an inwardly projecting T-member 14 at its other or free end, working through a longitudinal slot 15 in the other tire section 5. The body of the T-member 14 works through the slot 15, and stud rollers 16 are journaled upon the arms or branches of the said T-member, so as to work against the inner side of the respective tire section 5. The overlapping or yoke sections 12 are similarly disposed, with respect to the several tire sections 5, so that each of the tire sections 5 carries one of the supplemental or auxiliary sections 12, which slidably engages the companion or adjoining section 5. Thus, a fairly substantial tire structure is provided, which, due to the sliding engagement of the sections 5 and 12, may expand and contract to provide the requisite resiliency, the tire sections 5 being adapted to yield under the tension of the springs 6 for permitting vertical relief. There will be little tendency for the tire structure to have a lateral play, with respect to the wheel, which would be objectionable, the springs 6 tending to maintain the tire structure in the median plane of the wheel.

It is preferable to inclose the entire tire structure by a sheath 17, having its edges overlapping the inner side of the felly or rim 1, and connected by means of a lacing 18, or by other suitable means. The edges of the sheath 17 may be detachably secured to the felly or rim 1, in any suitable manner, so that the sheath will protect the working parts, from the access of dust, or other extraneous matter. The sheath 17 may be constructed of leather, rubber, or any other suitable material, and may have its tread of any suitable construction or formation.

From the foregoing, taken in connection with the drawing, the other advantages and capabilities of the present device will be apparent to those versed in the art, it being noted that the objects aimed at have been carried out satisfactorily.

Having thus described the invention, what is claimed as new is:—

In a vehicle wheel, a rim, a series of arcuate tire sections surrounding the same, a series of semi-elliptical springs having their central portions secured to the rim and having their ends pivoted to the ends of the respective tire sections, a supplemental arcuate tire section having one end secured to one end of each of the aforesaid tire sections, and having its other end overlapping the end of the adjoining tire section, the first mentioned tire sections having longitudinal slots, inwardly projecting T-shaped members secured to the free ends of the supplemental tire sections and working through the said slots, and stud rollers journaled upon the arms of the said members and working against the interior of the first mentioned tire sections.

In testimony that I claim the foregoing as my own, I have hereto affixed my signature in the presence of two witnesses.

ISAAC MORGAN SARTAIN.

Witnesses:
　IKE KEEL,
　C. M. WOODLIE.

Copies of this patent may be obtained for five cents each, by addressing the "Commissioner of Patents, Washington, D. C."